Patented Apr. 5, 1932

1,852,706

UNITED STATES PATENT OFFICE

JULIUS EISENSTEIN, OF CHICAGO, ILLINOIS, ASSIGNOR TO DANIEL S. BEEBE, K. E. ANDERSON, WILLIAM C. DUNN, AND JULIUS EISENSTEIN, TRUSTEES, KNOWN AS CHICAGO PAINT COMPANY, A TRUST

COATING COMPOSITION

No Drawing. Application filed March 30, 1928. Serial No. 266,113.

The present invention relates to improvements in coating compositions, and will be fully understood from the following description thereof, illustrated by specific examples embodying the invention.

My invention relates more particularly to compositions capable of producing impermeable, flexible and resistant coatings and in the application of which an aqueous vehicle may be employed. The constituents employed in producing the coating compositions are, in admixed form, readily mixed with water or other aqueous liquid to form a coating composition applicable with spray or brush, and in the absence of water, its properties are permanent and may be readily maintained, thus permitting commercial shipment of the coating material in a highly concentrated form, adapted for use merely upon the addition of water or other aqueous liquid. Upon the addition of water or other aqueous liquid to the admixed constituents, a liquid composition is secured which is readily applicable in the ordinary manner by spray or brush and forms a coating which, in a brief period of time, is highly resistant both to mechanical wear or abrasion and to chemical action and is unaffected by water, acids, alkalies or by atmospheric conditions.

The composition may be applied to materials of a wide variety of characteristics, such as wood, metals, ceramic materials, plasters, cements or the like. It is preferred, however, in the case of plasters or cements, to preliminarily size the base to which the coating is applied. Upon metals, particularly ferrous metals, the impermeable and stable coating formed by the composition of my invention act as an excellent preventive of corrosion.

In order that my invention may be clearly understood, I shall first describe a specific composition embodying the invention, and shall subsequently indicate certain possible equivalent materials which may replace in whole or in part the constituents therein set forth. It will be understood, of course, that the details of the specific examples as hereinafter set forth are for the purpose of illustration and are not intended to limit the scope of the invention or of the claims hereto appended.

A composition suitable for use in carrying out the present invention may be formed by admixing thoroughly in a dry state casein, urea, hexamethylenetetramine and lime together with pigments, fillers, or other additional inert constituents, as may be desired. The constituents are thoroughly ground, preferably to the fineness of paint pigments, either before or after mixing, it being advantageous to grind and mix together the casein, urea and hexamethylenetetramine and subsequently thoroughly mix and grind together the resulting mixture with the remaining constituents. With respect to the pigments or fillers employed, if a white coating or paint is desired, lithopone and zinc oxide may be employed, or titanium oxide and barium sulfate or other white pigments as desired. Venetian red, for example, is a suitable pigment for use if a red coating is desired. The proportion of the constituents of the mixture may be varied within very wide limits, as illustrated by the following specific examples.

|     |                        | Parts |
| --- | ---------------------- | ----- |
| (a) | Casein                 | 1000  |
|     | Urea                   | 340   |
|     | Hexamethylenetetramine | 210   |
|     | Lithopone              | 6950  |
|     | Zinc oxide             | 1000  |
|     | Lime                   | 500   |
| (b) | Casein                 | 1000  |
|     | Urea                   | 280   |
|     | Hexamethylenetetramine | 170   |
|     | Venetian red           | 7850  |
|     | Lime                   | 700   |

In either of the above formulas, the proportion of casein or of urea or of both may be widely varied, for example, one-half the amount given to fully twice the amount given. The proportions of pigments may, of course, be very widely varied depending upon the covering power of the pigments employed and the opacity desired in the final coating or film, or if an opaque film is not desired, pigments or fillers may be entirely omitted. The proportion of lime may be varied in either formula from 200 parts, more or less, to 750 parts, more or less. The composition thus produced is stable and remains unchanged substantially indefinitely if reasonable precautions to insure dryness are taken. Upon admixture with water, owing to the presence of the lime, an alkaline aqueous suspension is produced, of paint-like character which may be sprayed or brushed in place as desired. The proportion of water added may be varied within wide limits, as is readily apparent, in order to produce a liquid coating composition of desired viscosity characteristics for brushing or spraying under the particular circumstances in any particular case. In this respect, the characteristics of the liquid composition resulting may be varied as may any paint or distemper by greater or less additions of the vehicle. The film resulting from the application of the liquid composition dries out to form a flexible, coherent and non-porous coating which in a relatively short period of time forms an ultimate coating material, apparently by continued condensation or reaction of its constituents, which is highly impervious and resistant while retaining its flexibility and lacquer-like character. The coating is insoluble in water, acids, alkalies or organic solvents.

While numerous theories may be advanced as to the nature of the reactions occurring upon admixture of water to the initial composition and in the subsequent behavior of the film of the coating material during and after the evaporation of the water therefrom, and while it is not intended to limit the present invention in any way by such theories or hypotheses with reference thereto that may be expressed herein, it is believed that there are several reactions which proceed simultaneously and modify each other. As a result of the presence of the alkaline material, which, in the specific example set forth, is lime, the casein or the protein matter is wholly or partly converted to soluble bodies, which of themselves, on the evaporation of the water, form irreversible bodies. Furthermore, both the urea and the casein tend to form condensation products with the methylene body or hexamethylenetetramine, condensation beginnig in the presence of the aqueous vehicle and continuing in the film or coating after the evaporation of the water. The condensation reactions between the urea and hexamethylenetetramine on the one hand and the casein and hexamethylenetetramine on the other clearly mutually affect each other, as shown in marked fashion by the characteristics of the ultimate film as distinguished from the characteristic of the films produced when either casein or urea alone are present, but it is not possible to state whether this results from a physico-chemical action in which the initial and intermediate condensation products of each of the reactions affect the progress and nature of the other or whether a new type of condensation body of a distinctive chemical character is produced.

In carrying out the invention, a wide range of equivalent materials may be substituted for each of the specific constituents named in the specific examples given above, in which, however, the preferred constituents are set forth. Thus, in place of the casein, other protein materials, either animal or vegetable, may be employed, such as animal proteins, gelatin, albuminoids, dried blood, or the high protein vegetable materials such as soya bean and corn protein extracts. With these various materials, some changes in proportions are frequently desired; thus, with dried albumen, a somewhat less amount is necessary than of casein to produce a similar result say about one-half as much, whereas with soya bean extract, an amount should be employed equal to or slightly greater than the amount of casein.

In place of urea I may substitute other carbamide bodies, such as thiourea. I may also, but less desirably, employ other compounds which in the presence of proteins tend to form condensation products with aldehydes simultaneously with the protein condensation products formed, such as cresols, phenols or the like. Other methylene bodies may be substituted for the hexamethylenetetramine, such as trioxymethylene, formanilid. sodium formate, or in the event that it is desired to add the methylene body with the aqueous vehicle in place of including it as a solid constituent of a mixture capable of commercial handling, formaldehyde may be employed in proper proportions.

It is obvious that wide varieties of pigments, fillers, dyes or stains may be employed in accordance with the properties desired in the final coating. Any of the wide variety of inert mineral pigments, of which a few have been named above, may be employed and in addition, such pigments or fillers as chalk, magnesium carbonate, silica, kaolin, starch, arabinose, bentonite, asbestine or in some cases fibrous inert fillers as asbestos fiber may be employed. The proportions of such additional constituents may be very widely varied as is readily obvious. In place of lime, other suitable alkaline materials, such as borax, alkali metal phosphates, carbonates, or aluminates may be employed. Soluble or partly soluble alkaline materials generally may be employed in this connection, although it is preferred not to employ ammonium compounds or ammonia where the evolution of ammonia fumes may be undesirable, or where a possible porosity of the coating would render it unsuitable. The use of lime has been found particularly advantageous, its limited solubility preventing excessive alkalinity and providing at the same time a reserve supply of available or potentially alkaline material.

I claim:

1. A composition adapted to form a liquid coating composition on addition of water comprising in finely divided uncombined form, casein, urea and hexamethylenetetramine.

2. A composition adapted to form a liquid coating composition on addition of water comprising in finely divided, uncombined form, casein, urea, hexamethylenetetramine and an at least partly soluble alkaline material.

3. A composition adapted to form a liquid coating composition on addition of water comprising in finely divided, uncombined form, casein, urea, hexamethylenetetramine and lime.

4. A composition adapted to form a liquid coating composition on addition of water comprising in finely divided, uncombined form, a protein body, a carbamide body, a methylene body and an at least partly soluble alkali material.

5. A composition adapted to form a liquid coating composition on addition of water comprising in finely divided, uncombined form, a protein, urea, hexamethylenetetramine and an alkaline material.

6. A composition adapted to form a liquid coating composition on addition of water comprising in finely divided, uncombined form, casein, a carbamide body, a methylene body and an alkali.

7. A composition adapted to form a liquid coating composition on addition of water comprising in finely divided, uncombined form, a protein, a carbamide body, hexamethylenetetramine and an alkali.

In testimony whereof I have hereunto set my hand and seal, this 27th day of March, 1928.

JULIUS EISENSTEIN.